United States Patent
Lee et al.

(10) Patent No.: US 7,642,217 B2
(45) Date of Patent: Jan. 5, 2010

(54) PT/RU ALLOY CATALYST FOR FUEL CELL

(75) Inventors: Seol-ah Lee, Yongin-si (KR); Chan-ho Pak, Seoul (KR); Dae-jong Yoo, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 721 days.

(21) Appl. No.: 11/318,532

(22) Filed: Dec. 28, 2005

(65) Prior Publication Data

US 2006/0147788 A1 Jul. 6, 2006

(30) Foreign Application Priority Data

Jan. 6, 2005 (KR) .................. 10-2005-0001143

(51) Int. Cl.
B01J 23/42 (2006.01)
H01M 4/92 (2006.01)

(52) U.S. Cl. ................................ 502/339; 429/44

(58) Field of Classification Search .............. 429/40, 429/41, 42, 44, 45; 502/339
See application file for complete search history.

(56) References Cited

U.S. PATENT DOCUMENTS

| 6,066,410 | A | 5/2000 | Auer et al. | 429/40 |
| 6,326,098 | B1 * | 12/2001 | Itoh et al. | 429/40 |
| 2003/0157393 | A1 * | 8/2003 | Choi et al. | 429/40 |
| 2004/0087441 | A1 * | 5/2004 | Bock et al. | 502/339 X |
| 2004/0101718 | A1 | 5/2004 | Cao et al. | 429/13 |

FOREIGN PATENT DOCUMENTS

| CN | 1428882 | 7/2003 |
| JP | 09-153366 | 6/1997 |
| JP | 2002-222655 | * 8/2002 |
| JP | 2004-127814 | 4/2004 |

OTHER PUBLICATIONS

Abstract for US 2006/147788.
Certificate of Patent issued Nov. 26, 2008 for Chinese Patent No. 200510137551.3.
Zhou, Wei-Jiang, et al., "Preparation and Characterization of Anode Catalysts PtRu/C for Direct Methanol Fuel Cells", Chemical Journal of Chinese University, May 31, 2003, vol. 24, No. 5, pp. 858-862, Abstract Only.
Chinese Office Action for copending Chinese Patent Application No. 2005101375513 issued Aug. 31, 2007.
Gasteiger, H.A., et al., "LEIS and AES on sputtered and annealed polycrystalline Pt-Ru bulk alloys", Surface Science 293, 1993, pp. 67-80.

* cited by examiner

Primary Examiner—Stephen J. Kalafut
(74) Attorney, Agent, or Firm—Stein McEwen, LLP

(57) ABSTRACT

A platinum (Pt)/ruthenium (Ru) alloy catalyst, highly resistant to CO poisoning, having a lattice constant of 3.856-3.885 Å and a particle size of 2-5 nm, and supported on a carrier. The Pt/Ru alloy catalyst is highly resistant to CO poisoning, thereby allowing for higher catalytic activity when used. That is, an electrode and a fuel cell having a longer lifetime can be prepared using a smaller amount of the Pt/Ru alloy catalyst.

10 Claims, 4 Drawing Sheets

PT/RU ALLOY CATALYST FOR FUEL CELL

CROSS-REFERENCE TO RELATED APPLICATION

This application claims the benefit of Korean Patent Application No. 10-2005-1143, filed on Jan. 6, 2005 in the Korean Intellectual Property Office, the disclosure of which is incorporated herein by reference.

BACKGROUND OF THE INVENTION

1. Field of the Invention

An aspect of the present invention relates to a platinum (Pt)/ruthenium (Ru) alloy catalyst, and more particularly, to a Pt/Ru alloy catalyst which is highly resistant to CO poisoning, thereby allowing for higher catalytic activity when used.

2. Description of the Related Art

A fuel cell is a power generating system which can directly convert energy generated in an electrochemical reaction of oxygen with hydrogen contained in a hydrocarbon-based material, such as methanol, ethanol, and natural gas, into electrical energy.

Fuel cells are classified into phosphoric acid fuel cells (PAFCs), molten carbonate fuel cells (MCFCs), solid oxide fuel cells (SOFCs), polymer electrolyte membrane fuel cells (PEMFCs), and alkaline fuel cells (AFCs), etc., according to the type of electrolyte used. These fuel cells have basically the same operational principle, but differ from each other in the types of fuels, operational temperatures, catalysts, electrolytes, etc.

PEMFCs, which have been more recently developed, have greater power, can be operated at low operation temperatures, and have rapid starting and response characteristics. PEMFCs can be used for vehicles, houses and public buildings, electronic devices, etc.

In a membrane electrode assembly (MEA) of a PEMFC, a polymer electrolyte exists between an anode electrode and a cathode electrode. An oxidation reaction producing a hydrogen ion and an electron from the fuel occurs at the anode electrode, and the hydrogen ion produced is transported to the cathode electrode through the polymer electrolyte membrane. A reduction reaction producing water from the transported hydrogen ion and oxygen supplied from outside occurs at the cathode electrode.

In the PEMFC, hydrogen obtained by reforming gasoline, methane, methanol, etc., is used as a fuel. In the reforming reaction, hydrogen and a small amount of monoxide (CO) as a byproduct are formed. The catalyst is deteriorated due to the CO, and as a result, the performance of the PEMFC is deteriorated.

A direct methanol fuel cell (DMFC) is a PEMFC using methanol as a fuel. CO is formed as a byproduct of an oxidation reaction of the methanol at the anode and the catalyst is poisoned by the CO, and as a result, the performance of the DMFC is deteriorated.

A Pt/Ru alloy catalyst which is resistant to CO poisoning has been suggested. Japanese Laid-Open Patent Publication No. Hei 9-153366A describes a method of preparing a Pt/Ru alloy catalyst. In this method, a carrier, for example, carbon powders, is contacted with a solution of Pt and Ru cations to adsorb the cations on the carrier, and then the carrier is heated under reducing atmosphere to reduce the cations.

Noticing a relationship between the concentration of oxygen contained in a Pt/Ru alloy catalyst and resistance to CO poisoning, Japanese Laid-Open Patent Publication No. 2004-127814 describes a Pt/Ru alloy catalyst in which the concentration of oxygen is less than 4.4% by mass.

However, there is no mention that the resistance to CO poisoning can be obtained by using a Pt/Ru alloy having a uniform structure and a uniform distribution of particle size. Thus, there is a need to improve the resistance to CO poisoning of the Pt/Ru alloy catalyst.

SUMMARY OF THE INVENTION

An aspect of the present invention provides a Pt/Ru alloy catalyst that has high catalytic efficiency and is highly resistant to CO poisoning.

Another aspect of the present invention provides a method of preparing the Pt/Ru alloy catalyst.

Another aspect of the present invention provides an electrode for use in a fuel cell, including the Pt/Ru alloy catalyst.

Another aspect of the present invention provides a fuel cell in which an anode contains the Pt/Ru alloy catalyst.

According to another aspect of the present invention, there is provided a platinum (Pt)/ruthenium (Ru) alloy catalyst having a lattice constant of 3.856-3.885 Å and a particle size of 2-5 nm, the alloy catalyst containing a carrier.

According to another aspect of the present invention, there is provided a method of preparing a Pt/Ru alloy catalyst, including: dissolving a Pt precursor and a Ru precursor, respectively, in water, and mixing the obtained solutions with each other to obtain a metal salt solution, wherein a molar ratio of Pt of the Pt precursor and Ru of the Ru precursor is 7:3-4.5:5.5; mixing a catalyst carrier with a solvent to obtain a carrier solution; mixing the metal salt solution with the carrier solution to obtain a mixed solution; adjusting the pH of the mixed solution to 11-13; heating the resultant product to form catalyst particles; isolating and washing the formed catalyst particles; and heat-treating the catalyst particles.

According to yet another aspect of the present invention, there is provided an electrode for use in a fuel cell, including the Pt/Ru alloy catalyst.

According to still another aspect of the present invention, there is provided a fuel cell, including a cathode; an anode; and a polymer electrolyte membrane interposed between the cathode and the anode, wherein the anode contains the Pt/Ru alloy catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
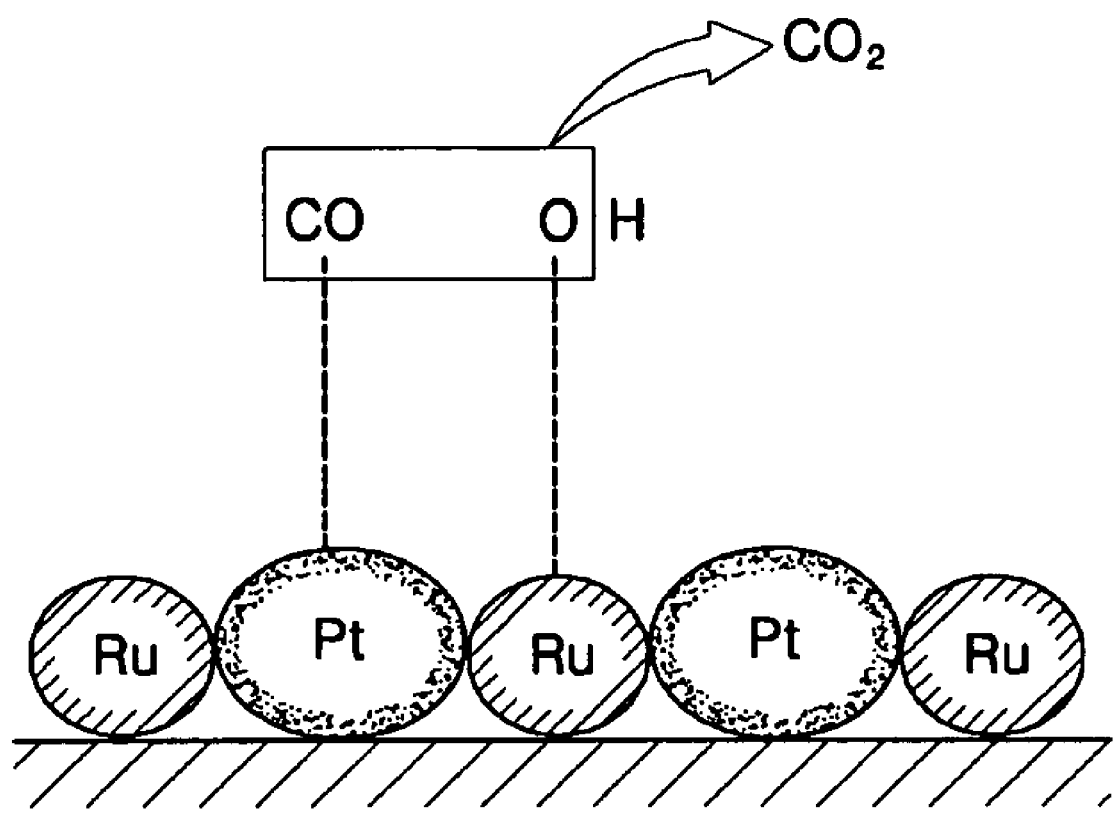
FIG. 1 is a schematic view illustrating a mechanism that a Pt/Ru alloy catalyst exhibits a resistance to CO poisoning.
Figure 2:
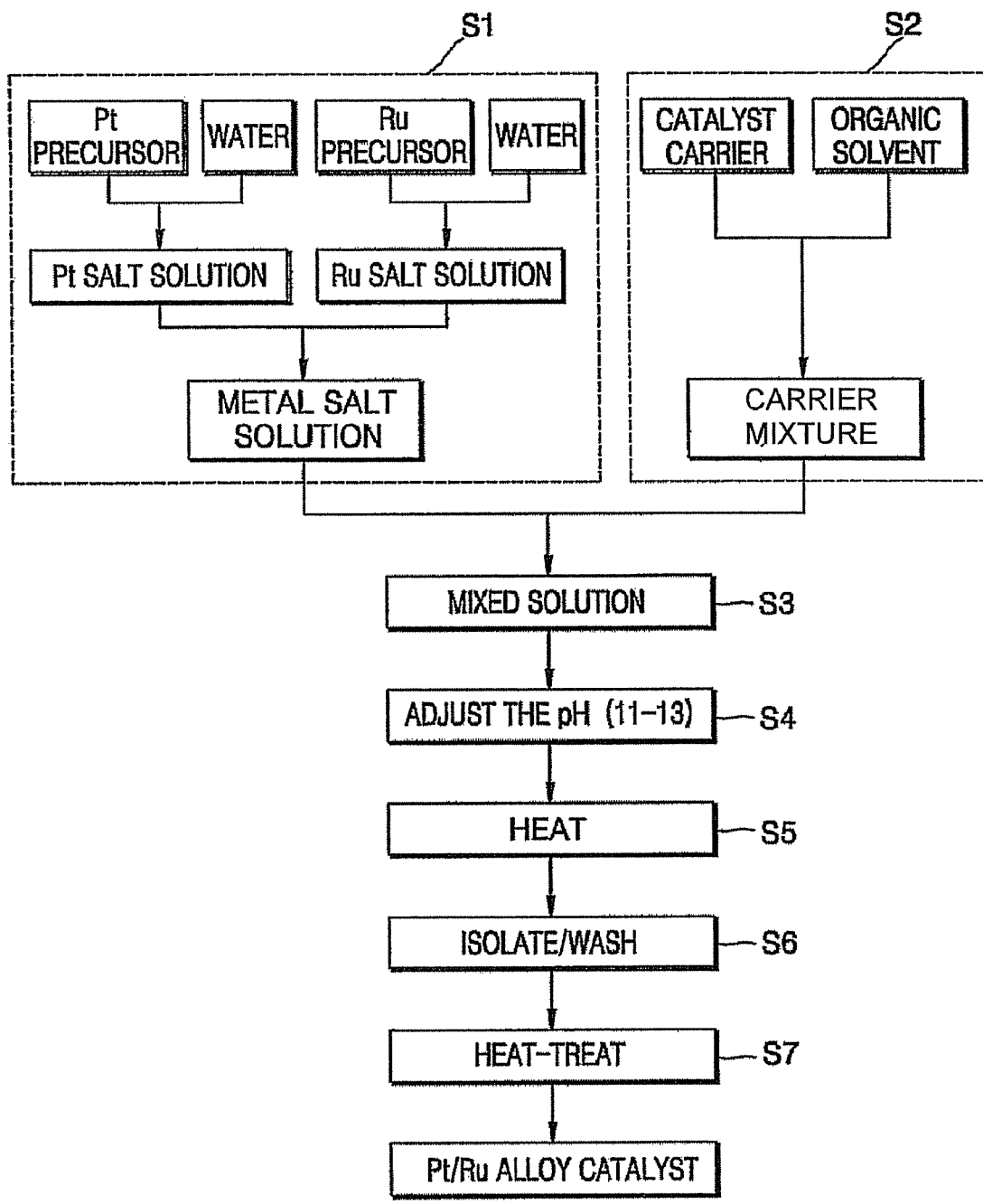
FIG. 2 is a flow diagram illustrating a method of preparing a Pt/Ru alloy catalyst according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is known that a Pt/Ru alloy catalyst is relatively highly resistant to CO poisoning. A so-called bifunctional mechanism is known as a mechanism of the resistance to CO poisoning. In the bifunctional mechanism, a CO molecule adsorbed on a Pt atom reacts with a hydroxy group binding to an Ru atom adjacent to the Pt atom to form a carbon dioxide molecule, and thus, the catalyst is less poisoned by the CO (see FIG. 1).

In order to maximize the effects of the bifunctional mechanism, it is advantageous that the Pt atom corresponds to the Ru atom in a ratio 1:1. Thus, in order to increase a total catalytic efficiency of the Pt/Ru alloy catalyst, it is important that a molar ratio of the Pt atom and the Ru atom in the Pt/Ru alloy catalyst is 1:1 or near 1:1 and the Pt atom and the Ru atom are uniformly distributed to maximize the number of adjacent Pt—Ru pair corresponding to each other in a ratio 1:1.

A lattice constant was calculated from 2θ of a Pt—Ru peak observed in an X-ray diffraction (XRD) pattern of an alloy metal bulk prepared using an arc-melting method (Gasteiger, H. A. et al., LEIS and AES on sputtered and annealed polycrystalline Pt—Ru bulk alloys, Surface Science, 293 (1993), pp. 67-80). Also, a method of calculating an alloy ratio of Pt and Ru from the lattice constant is disclosed in the above literature. Based on this method, an alloy ratio of Pt and Ru is calculated in the present application.

A Pt/Ru alloy catalyst according to an embodiment of the present invention has a lattice constant of 3.856-3.885 Å. If the lattice constant of the Pt/Ru alloy catalyst deviates from the above range, the bifunctional mechanism cannot easily occur in the Pt/Ru alloy catalyst, thereby reducing the catalytic efficiency. Further, the Pt/Ru alloy catalyst has a particle size of 2-5 nm. If the particle size of the Pt/Ru alloy catalyst is greater than 5 nm, a specific surface area of the catalyst decreases, thereby reducing the catalytic efficiency. If the particle size of the Pt/Ru alloy catalyst is less than 2 nm, the Pt/Ru alloy catalyst cannot be easily synthesized without agglomeration.

As described above, ideally a molar ratio of the Pt atom and the Ru atom should be 1:1, but this is difficult to obtain 1:1. A practical alloy ratio in a Pt/Ru alloy catalyst available from Johnson Matthey Co. was 4.4:5.6 and a practical alloy ratio in a Pt/Ru alloy catalyst available from E-TEK was 7.1:2.9, when calculated using the Table in the above literature by Gasteiger et al., although the alloy ratios in the above products are indicated as 1:1 and analyzed as 1:1 by elemental analysis. However, when the Pt/Ru alloy catalyst according to an embodiment of the present invention has a lattice constant of 3.856-3.885 Å, it exhibits high catalytic efficiency and in this case, an alloy ratio of Pt and Ru is 7:3-4.5:5.5 (in a molar ratio). If the molar ratio of Pt and Ru deviates from the above range, the catalytic efficiency of the Pt/Ru alloy catalyst may be reduced. In order to obtain higher catalytic efficiency, the molar ratio of Pt and Ru is preferably 5.5:4.5-4.8:5.2.

A total concentration of Pt and Ru may be 60-80% by weight of the Pt/Ru alloy supported catalyst. If the total concentration of Pt and Ru is less than 60% by weight of the Pt/Ru alloy supported catalyst, a thickness of a catalytic layer in an anode increases, and thus an electrical resistance excessively increases. If the total concentration of Pt and Ru is greater than 80% by weight of the Pt/Ru alloy supported catalyst, the catalyst particles are agglomerated, and thus the specific surface area decreases and the utilization efficiency of the catalyst decreases.

The Pt/Ru alloy catalyst has a mass activity of 15-80 $A/(g_{PtRu})$ at a cell potential of 0.6 V. If the mass activity of the Pt/Ru alloy catalyst is less than 15 $A/(g_{PtRu})$ at a cell potential of 0.6 V, a fuel cell manufactured using the Pt/Ru alloy catalyst has a poor performance. If the mass activity of the Pt/Ru alloy catalyst is greater than 80 $A/(g_{PtRu})$ at a cell potential of 0.6 V, such a Pt/Ru alloy catalyst cannot be easily prepared.

Examples of a carrier supporting the Pt and Ru atoms include a carbon-based carrier, zeolite, and silica/alumina, etc., preferably a carbon-based carrier and zeolite. Examples of the carbon-based carrier include graphite, carbon powders, acetylene black, carbon black, activated carbon, mesoporous carbon, carbon nanotubes, carbon nanofibers, carbon nanohorns, carbon nanorings, carbon nanowires, or fullerene ($C_{60}$).

A method of preparing a Pt/Ru alloy catalyst according to an embodiment of the present invention will now be described.

First, a Pt precursor and a Ru precursor are dissolved in water, respectively. The Pt precursor and the Ru precursor may be weighed such that a molar ratio of the Pt precursor and the Ru precursor is 7:3-4.5:5.5. If the molar ratio of the Pt precursor and the Ru precursor deviates from the above range, a molar ratio of Pt and Ru in the Pt/Ru alloy catalyst to be formed may be also deviated from a range of 7:3-4.5:5.5 in many cases. The water used may be deionized water.

The Pt precursor and the Ru precursor may be in the form of salts capable of being easily dissociated in water, for example, chlorides, sulfides, nitrides of Pt and Ru, respectively.

Then, the solution of the Pt precursor in water is mixed with the solution of the Ru precursor in water to obtain a metal salt solution.

Next, a carrier for supporting the active components Pt and Ru is dispersed in a solvent to obtain a carrier mixture. As described above, examples of a carrier used include a carbon-based carrier, zeolite, and silica/alumina, etc., preferably a carbon-based carrier and zeolite. Examples of the carbon-based carrier include graphite, carbon powders, acetylene black, carbon black, activated carbon, mesoporous carbon, carbon nanotubes, carbon nanofibers, carbon nanohorns, carbon nanorings, carbon nanowires, or fullerene ($C_{60}$).

The solvent in which the carrier to be dispersed may be an organic solvent which can also function as a reducing agent. Preferably, the solvent is an organic solvent containing a hydroxy (OH) group, preferably two or more OH groups. More preferably, the organic solvent is ethylene glycol.

A weight ratio of the organic solvent used in the carrier mixture and the water used in the metal salt solution may be 1:0.4-1:0.6. If the weight ratio of the water used in the metal salt solution to the organic solvent used in the carrier mixture is less than 0.4, sizes of the particles formed increase, and thus the specific surface area of the particles decreases. If the weight ratio of the water used in the metal salt solution to the organic solvent used in the carrier mixture is greater than 0.6, i.e., the ratio of the organic solvent which also functions as a reducing agent is too low, a reduction reaction for generating the Ru poorly occurs, and thus the concentration of the Ru in the Pt/Ru alloy catalyst decreases.

Next, the metal salt solution is mixed with the carrier mixture to obtain a mixed solution (also referred to herein as a "resultant mixture"), and then the pH of the mixed solution is adjusted. Thus, the active components are reduced during the reduction process, while being supported on the carrier. The pH of the mixed solution may be adjusted to 11-13. A pH adjusting agent may be an alkaline solution, such as NaOH, $NH_3$, KOH, or $Ca(OH)_2$.

If the pH of the mixed solution is adjusted to less than 11, the reduction amount decreases during the reduction process, and thus the amount of the supported catalyst decreases, and also the catalyst particles supported agglomerates to each other. If the pH of the mixed solution is adjusted to greater than 13, the particle size increases.

Subsequently, the pH adjusted solution is slowly heated to form catalyst precursor particles. The heating may be performed by placing the reactor in a water bath. In this case, the oil bath is warmed to 150-180° C. for 20-40 minutes and maintained at the temperature for 1-5 hours.

If the temperature of the oil bath is less than 150° C., the reduction of the catalyst atoms cannot easily occur, thereby reducing the alloying degree of the catalyst. If the temperature of the oil bath is greater than 180° C., the particle size of the alloy catalyst increases and the temperature may exceed a boiling temperature of the organic solvent.

Then, the formed catalyst precursor is isolated using a conventional method, for example, filtration or centrifuging, and then washed.

Next, the washed catalyst precursor particles are heat-treated to prepare a Pt/Ru alloy catalyst. The heat-treatment may be performed at 250-500° C. The heat-treatment time may be 5 minutes-2 hours, depending on the amount of the catalyst to be formed.

If the heat-treatment temperature is less than 250° C., a ratio of Ru in the alloy decreases and the bifunctional mechanism cannot actively occur, and thus the catalyst is less resistant to CO poisoning. If the heat-treatment temperature is greater than 500° C., the particle size increases, thereby reducing the utilization efficiently of the catalyst.

The Pt/Ru alloy catalyst thus obtained can be used as an active component promoting an oxidation reaction of hydrogen containing CO, or methanol at an anode electrode of a fuel cell. The fuel cell can be manufactured using a conventional method.

The Pt/Ru alloy catalyst is dispersed in a dispersion medium, such as isopropyl alcohol, tetrabutyl acetate, and n-butyl acetate, together with an ionomer, such as Nafion, to obtain a slurry and the resultant slurry is coated on a gas diffusion layer.

The gas diffusion layer includes a substrate and a carbon layer.

The carbon layer may be formed by coating a mixture of carbon black, a volatile solvent such as isopropyl alcohol, and a hydrophobic polymer polytetrafluoroethylene (PTFE), having a concentration of 50% by weight of the carbon black, on the substrate using a spraying method. After drying, the PTFE is sintered at 350° C. for 30 minutes.

The substrate may be carbon paper, preferably water-repelled carbon paper, more preferably water-repelled carbon paper or carbon cloth, coated with a layer composed of water-repelled carbon black.

The water-repelled carbon paper comprises about 5-50% by weight of a hydrophobic polymer such as PTFE and the hydrophobic polymer can be sintered. The water-repelling treatment of the gas diffusion layer establishes paths for both polar liquid reactants and gas reactants.

In the water-repelled carbon paper coated with a layer composed of water-repelled carbon black, the layer of the water-repelled carbon black includes carbon black and about 20-50% by weight of a hydrophobic polymer such as PTFE, as a hydrophobic binder. The layer of the water-repelled carbon black is attached on a surface of the water-repelled carbon paper. The hydrophobic polymer in the layer of the water-repelled carbon black is sintered.

In an embodiment of the present invention, a fuel cell includes a cathode having a catalytic layer and a diffusion layer an anode having a catalytic layer and a diffusion layer; and a polymer electrolyte layer interposed between the cathode and the anode, wherein the anode contains the Pt/Ru alloy catalyst according to an embodiment of the present invention.

The fuel cell according to an embodiment of the present invention may be a PAFC, a PEMFC, or a DMFC, and preferably is a DMFC.

Such fuel cell may be manufactured using conventional methods, and thus the detailed descriptions thereof will not be provided herein.

Hereinafter, an aspect of the present invention will be described in more detail with reference to the following examples. However, these examples are given for the purpose of illustration and are not intended to limit the scope of the invention.

In the following Examples and Comparative Examples, crystal sizes were obtained from Scherrer's equation represented by equation 1 using a width of a Pt/Ru peak:

$$d_B = \frac{k\lambda}{B_d \cos\theta} \quad (1)$$

wherein
$\lambda$ is a wavelength of an X-ray,
k is Scherrer constant,
$\theta$ is Bragg's angle, and
$B_d$ is a corrected line width for particle size broadening.

EXAMPLE 1

1 g of hydrogen platinic chloride hydrate ($H_2PtCl_6 \cdot xH_2O$) was added to 25 ml of water and stirred until dissolved. Separately, 0.44 g of ruthenium chloride hydrate ($RuCl_3 \cdot H_2O$) was added to 25 ml of water and stirred until dissolved. The obtained solutions were mixed with each other to obtain a metal salt solution (operation S1).

0.254 g of carbon black was added to 100 g of ethylene glycol and stirred until uniformly dispersed, thereby obtaining a carrier mixture (operation S2).

Then, the metal salt solution was mixed with the carrier mixture to obtain a mixed solution (operation S3). The pH of the mixed solution was adjusted to 11 by adding dropwise a NaOH solution while measuring the pH using a pH meter (operation S4).

Then, the pH-adjusted solution was heated by warming a oil bath to 180° C. for 30 minutes and maintaining the water bath at 180° C. for 4 hours. Thus, the Pt and Ru were reduced to form catalyst particles (operation S5).

The formed catalyst particles were isolated by filtration and washed with deionized water three times (operation S6).

Next, the washed catalyst precursor particles were freeze-dried and heat-treated at 500° C. for 15 minutes under hydrogen atmosphere to obtain a Pt/Ru alloy catalyst (operation S7).

The obtained Pt/Ru alloy catalyst was subjected to an X-ray diffraction (XRD) analysis, which demonstrated that a lattice constant of the catalyst was 3.8614 Å and a molar ratio of Pt and Ru was 51:49.

A half-cell was manufactured using the Pt/Ru alloy catalyst. A mass activity of the half-cell was 19.8 $A/g_{PtRu}$. The term "mass activity" refers to a current generated in a half-cell divided by the number of gram of a catalyst used in the half-cell.

In the manufacturing of the half-cell, the Pt/Ru alloy catalyst was mixed with a solution of an ionomer Nafion in isopropyl alcohol to obtain a slurry and the slurry was coated on a carbon paper and dried. A solution used in measuring the activity of the half-cell was a mixture of a 0.5 M sulfuric acid solution with a 2.0 M methanol and a silver/saturated silver chloride electrode was used as a reference electrode.

Although CO-adsorbate was generated due to an oxidation reaction of the methanol used in the half-cell when measuring the mass activity, the mass activity was high, indicating that the catalyst is highly resistant to CO poisoning.

EXAMPLES 2 THROUGH 5

Each of Pt/Ru alloy catalysts was prepared in the same manner as in Example 1, except that a heat-treatment time and temperature were changed as described in Table 1. Then, a lattice constant, a ratio of Pt/Ru, and a mass activity of each of the Pt/Ru alloy catalysts were measured in the same manner as in Example 1. The results are shown in Table 1.

TABLE 1

| | Heat-treatment temperature/time | Lattice constant (Å) | Pt/Ru ratio | Mass activity ($A/g_{PtRu}$) | Crystal size (nm) |
|---|---|---|---|---|---|
| Example 1 | 500° C./15 min | 3.8614 | 51:49 | 19.8 | 3.2 |
| Example 2 | 500° C./60 min | 3.8720 | 60:40 | 50.0 | 3.7 |
| Example 3 | 500° C./5 min | 3.8718 | 59:41 | 25.9 | 3.3 |
| Example 4 | 350° C./15 min | 3.8734 | 61:39 | 39.9 | 3.1 |
| Example 5 | 250° C./15 min | 3.8788 | 65:35 | 28.2 | 2.8 |

In examples 1, 4, and 5 where the heat-treatment times were identical (e.g., 15 minutes), as the heat-treatment temperature increased, the Pt/Ru alloy ratio was closer to 1:1 and the crystal size increased, but the mass activity did not increase.

In examples 1, 2, and 3, where the heat-treatment temperatures were identical (e.g., 500° C.), although the heat-treatment time increased, the mass activity did not increase.

From the fact that the lattice constant of each of the Pt/Ru alloy catalysts is close to a lattice constant of pure Pt (3.9231 Å), not to a lattice constant of pure Ru (2.7058 Å), it was assumed that each of the Ru atoms was inserted into a lattice structure of the Pt. From the fact that the lattice constant of the Pt/Ru alloy catalyst was smaller than the lattice constant of pure Pt, it was also assumed that the Pt and the Ru in an atom state are uniformly dispersed.

Figure 3A:
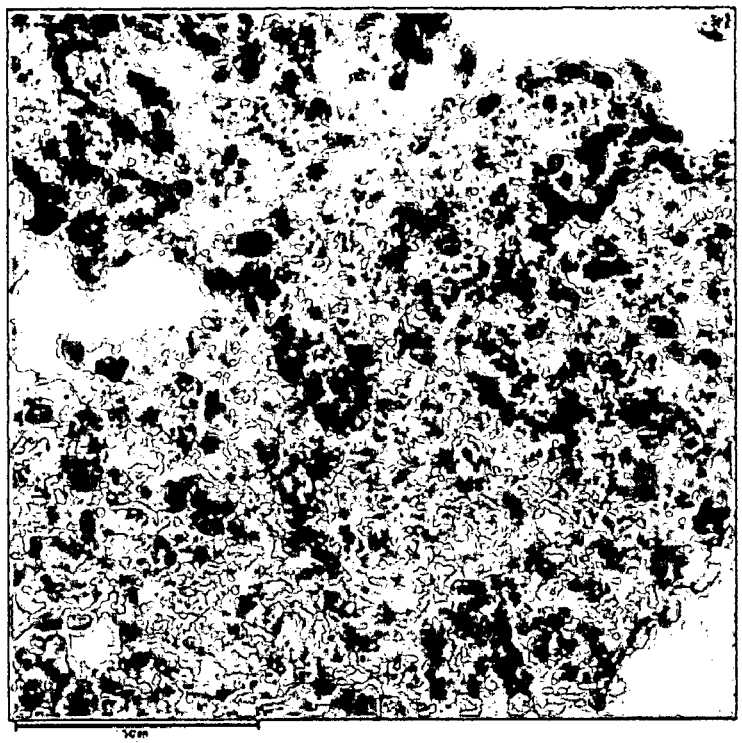
FIG. 3A is a transmission electron microscopic (TEM) image of a Pt/Ru alloy catalyst obtained in Example 4 according to an embodiment of the present invention.
Figure 3B:
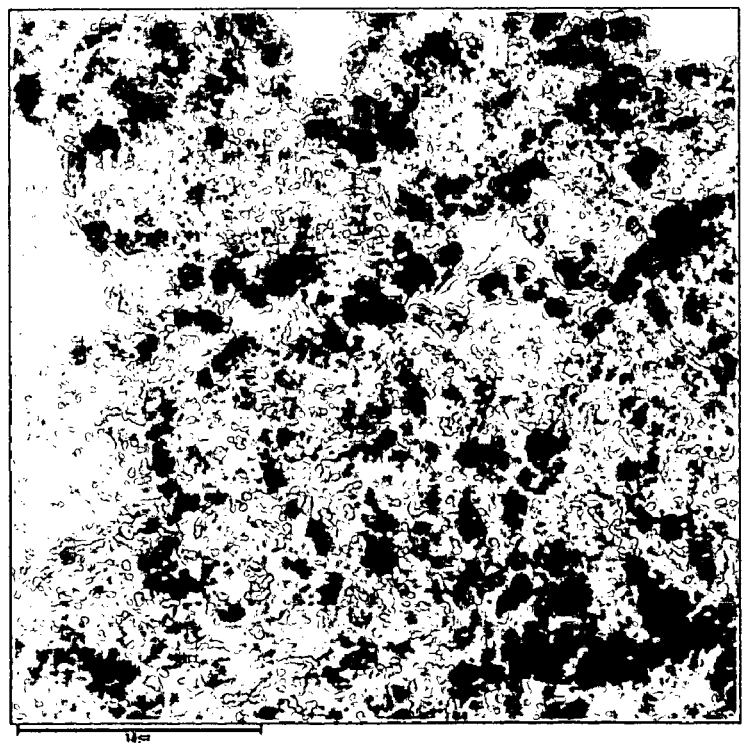
FIG. 3B is a TEM image of a Pt/Ru alloy catalyst obtained in Example 1 according to an embodiment of the present invention.

FIG. 3A is a transmission electron microscopic (TEM) image of a Pt/Ru alloy catalyst obtained in Example 4. FIG. 3B is a TEM image of a Pt/Ru alloy catalyst obtained in Example 1. The heat-treatment temperature in Example 1 was 500° C., higher than the heat-treatment temperature in Example 4, which was 350° C., and the heat-treatment time in Example 1 was the same as in Example 4 (15 minutes). More agglomerates of catalyst in dark color in FIG. 3B were observed than in FIG. 3A, indicating that the Pt/Ru alloy catalyst in FIG. 3A (Example 4), which was heat-treated at a lower temperature, had a higher dispersibility than the Pt/Ru alloy catalyst in FIG. 3B (Example 1).

EXAMPLES 6 THROUGH 9

Each of Pt/Ru alloy catalysts was prepared in the same manner as in Example 1, except that the conditions described in Table 2 were used.

TABLE 2

| | $H_2PtCl_6.xH_2O$ (g) (water/g) | $RuCl_3.H_2O$ (g) (water/g) | Carbon black (g) | Ethylene glycol (g) | pH | Heat-treatment temperature/time |
|---|---|---|---|---|---|---|
| Example 6 | 1 50 | 0.44 50 | 0.254 | 200 | 13 | 350° C. 15 min |
| Example 7 | 1 37.5 | 0.44 37.5 | 0.254 | 150 | 12 | 350° C. 15 min |
| Example 8 | 1 28.6 | 0.44 28.6 | 0.254 | 143 | 11 | 350° C. 15 min |
| Example 9 | 1 40 | 0.44 40 | 0.254 | 120 | 11 | 350° C. 15 min |

Then, a lattice constant, a ratio of Pt/Ru, and a mass activity of each of the Pt/Ru alloy catalysts thus obtained were measured in the same manner as in Example 1. The results are shown in Table 3.

TABLE 3

| | Lattice constant (Å) | Pt/Ru ratio | Mass activity ($A/g_{PtRu}$) | Crystal size (nm) |
|---|---|---|---|---|
| Example 6 | 3.8654 | 54:46 | 37.6 | 3.2 |
| Example 7 | 3.8678 | 56:44 | 25.1 | 3.3 |
| Example 8 | 3.8831 | 69:31 | 30.2 | 3.1 |
| Example 9 | 3.8818 | 67:33 | 29.0 | 3.3 |

From the fact that the lattice constant of each of the Pt/Ru alloy catalysts is close to a lattice constant of pure Pt (3.9231 Å), not to a lattice constant of pure Ru (2.7058 Å), it was assumed that each of the Ru atoms was inserted into a lattice structure of the Pt.

COMPARATIVE EXAMPLES 1 THROUGH 3

The physical properties of conventional catalysts were measured. Although each label indicated a Pt/Ru alloy ratio as 50:50 (Comparative Examples 1 and 2) or 33:67 (Comparative Example 3), a practical alloy ratio in each of the catalysts, when measured according to the literature (Gasteiger, H. A. et al., LEIS and AES on sputtered and annealed polycrystalline Pt—Ru bulk alloys, Surface Science, 293 (1993), pp. 67-80) was as follows:

TABLE 4

| Catalyst | | Pt/Ru ratio | | Lattice constant (Å) | Mass activity $(A/g_{PtRu})$ | Crystal size (nm) |
|---|---|---|---|---|---|---|
| | | Nominal | Found | | | |
| Comparative Example 1 | JM | 50:50 | 44:56 | 3.8462 | 22.8 | 2.1 |
| Comparative Example 2 | E-TEK | 50:50 | 71:29 | 3.8862 | 18.0 | 2.6 |
| Comparative Example 3 | Tanaka | 33:67 | 44:56 | 3.8530 | 29.0 | 3.3 |

In general, the mass activities in Comparative Examples 1 through 3 were at most about 36-81% of the mass activities in Examples 1-9, although in some cases, a mass activity was higher than in the Examples 1~9. Thus, it was confirmed that the Pt/Ru alloy catalysts according to embodiments of the present invention are more resistant to CO poisoning than the conventional Pt/Ru alloy catalysts.

EXAMPLE 10

An electrode for use in a fuel cell was prepared using the Pt/Ru alloy catalyst obtained in Example 4. A weight ratio of Pt/Ru in the supported catalyst was 70% by weight. The Pt/Ru alloy catalyst was loaded on an anode electrode in a loading amount of 3.8 mg/cm$^2$, and a Pt black catalyst was loaded on a cathode electrode in a loading amount of 6.3 mg/cm$^2$.

Nafion 115 was used as an electrolyte layer and the temperature of the cell was 50° C. Air was used as an oxidizing agent in the cathode electrode and a 1 M methanol solution was used as a fuel in the anode electrode.

Figure 4:
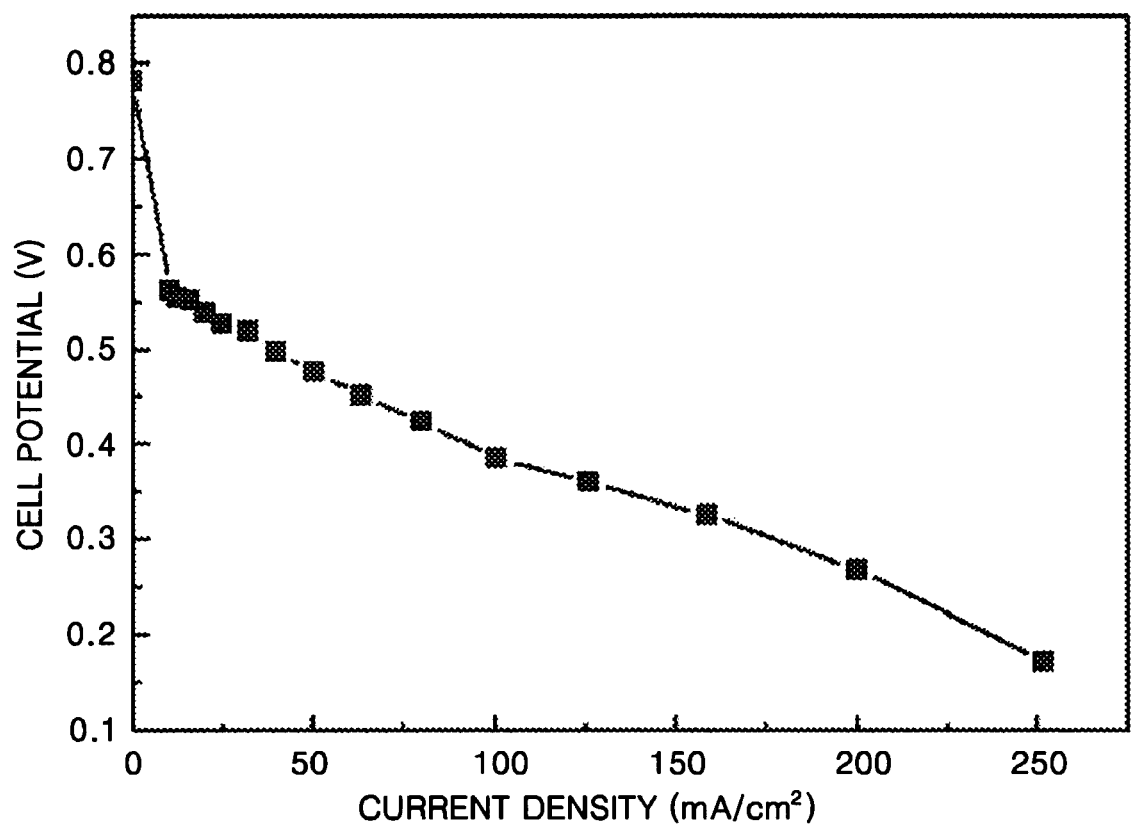
FIG. 4 is a graph of current density vs. cell potential of a fuel cell in which an anode contains a Pt/Ru alloy catalyst according to an embodiment of the present invention.

The fuel cell thus obtained was subjected to a performance test. A graph of current density vs. cell potential of the fuel cell is illustrated in FIG. 4.

A Pt/Ru alloy catalyst according to an aspect of the present invention is highly resistant to CO poisoning, thereby allowing for higher catalytic activity when used. That is, an electrode and a fuel cell having a longer lifetime can be prepared using a smaller amount of the Pt/Ru alloy catalyst.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of preparing a Pt/Ru alloy catalyst, comprising:
    dissolving a Pt precursor and a Ru precursor, respectively, in water to obtain solutions, and mixing the obtained solutions with each other to obtain a metal salt solution, wherein a molar ratio of Pt of the Pt precursor and Ru of the Ru precursor is 7:3-4.5:5.5;
    mixing a catalyst carrier with a solvent to obtain a carrier mixture;
    mixing the metal salt solution with the carrier mixture to obtain a resultant mixture;
    adjusting a pH of the resultant mixture to 11-13 to obtain a product;
    heating the resultant product to form catalyst particles;
    isolating and washing the formed catalyst particles; and
    heat-treating the catalyst particles.

2. The method of claim 1, wherein the catalyst carrier is a carbon-based carrier or zeolite.

3. The method of 2, wherein the carbon-based carrier is one of graphite, carbon powders, acetylene black, carbon black, activated carbon, mesoporous carbon, carbon nanotubes, carbon nanofibers, carbon nanohorns, carbon nanorings, carbon nanowires, and fullerene (C60).

4. The method of 1, wherein the solvent is an organic solvent containing a hydroxy (OH) group.

5. The method of claim 4, wherein the organic solvent is ethylene glycol.

6. The method of claim 1, wherein a weight ratio of the solvent used in the carrier mixture and the water used in the metal salt solution is 1:0.4-1:0.6.

7. The method of claim 1, wherein the heat-treatment is performed at 250-500° C.

8. The method of claim 1, wherein the water used to obtain the solutions is deionized water.

9. The method of claim 1, wherein the Pt precursor and the Ru precursor are in the form of salts.

10. The method of claim 1, wherein a heat-treating time of the catalyst particles ranges from 5 minutes to 2 hours.

* * * * *